US012630689B2

(12) United States Patent
Zhao et al.

(10) Patent No.: US 12,630,689 B2
(45) Date of Patent: May 19, 2026

(54) COMPOSITE MATERIAL FILM, MANUFACTURING METHOD THEREOF, AND DISPLAY PANEL

(71) Applicant: SHENZHEN CHINA STAR OPTOELECTRONICS SEMICONDUCTOR DISPLAY TECHNOLOGY CO., LTD., Shenzhen (CN)

(72) Inventors: Jinyang Zhao, Shenzhen (CN); Lixuan Chen, Shenzhen (CN); Zhiqing Shi, Shenzhen (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 1006 days.

(21) Appl. No.: 17/753,057

(22) PCT Filed: Jan. 19, 2022

(86) PCT No.: PCT/CN2022/072794
§ 371 (c)(1),
(2) Date: Feb. 16, 2022

(87) PCT Pub. No.: WO2023/133910
PCT Pub. Date: Jul. 20, 2023

(65) Prior Publication Data
US 2024/0034852 A1 Feb. 1, 2024

(30) Foreign Application Priority Data
Jan. 13, 2022 (CN) .......................... 202210037320.9

(51) Int. Cl.
*C08J 9/35* (2006.01)
*C08J 9/00* (2006.01)
(Continued)

(52) U.S. Cl.
CPC ................. *C08J 9/35* (2013.01); *C08J 9/008* (2013.01); *C09K 11/02* (2013.01); *C09K 11/883* (2013.01);
(Continued)

(58) Field of Classification Search
CPC ............. C09K 11/00; C09K 11/02; C08J 9/35
See application file for complete search history.

(56) References Cited

U.S. PATENT DOCUMENTS

2003/0024997 A1* 2/2003 Welch ....................... A61L 9/01
422/4
2016/0027966 A1 1/2016 Dubrow et al.
(Continued)

FOREIGN PATENT DOCUMENTS

CN 101525533 A 9/2009
CN 104932136 A 9/2015
(Continued)

OTHER PUBLICATIONS

CN107017325A Machine Translation (Year: 2017).*
(Continued)

*Primary Examiner* — Matthew E. Hoban
(74) *Attorney, Agent, or Firm* — PV IP PC; Christopher S. Ruprecht; Wei Te Chung

(57) ABSTRACT

A composite material film, a manufacturing method thereof, and a display panel including the composite material film are provided. The composite material film includes at least one film layer including porous material units, wherein a surface of the porous material unit has pores loaded with nanoparticles or small organic molecules, wherein a pore size of the
(Continued)

pore matches a particle size of the nanoparticle or a size of the small organic molecule.

12 Claims, 4 Drawing Sheets

(51) Int. Cl.
*C09K 11/02* (2006.01)
*C09K 11/88* (2006.01)

(52) U.S. Cl.
CPC ...... *C08J 2205/042* (2013.01); *C08J 2207/00* (2013.01)

(56) References Cited

U.S. PATENT DOCUMENTS

| | | | |
|---|---|---|---|
| 2017/0153382 A1 | 6/2017 | Wang et al. | |
| 2017/0306221 A1* | 10/2017 | Koole | .................. C03C 14/004 |
| 2021/0050541 A1 | 2/2021 | Zeng | |

FOREIGN PATENT DOCUMENTS

| | | | |
|---|---|---|---|
| CN | 105733556 | A | 7/2016 |
| CN | 107017325 | A | 8/2017 |
| CN | 107689388 | A | 2/2018 |
| CN | 108410447 | * | 8/2018 |
| CN | 108410447 | A | 8/2018 |
| CN | 108415193 | A | 8/2018 |
| CN | 108615752 | A | 10/2018 |
| CN | 109679656 | A | 4/2019 |
| CN | 110922962 | A | 3/2020 |
| CN | 111349439 | A | 6/2020 |
| CN | 111378425 | A | 7/2020 |
| CN | 111423880 | A | 7/2020 |
| CN | 112540508 | A | 3/2021 |
| CN | 112635642 | A | 4/2021 |
| CN | 113066950 | A | 7/2021 |
| JP | 2017110040 | A | 6/2017 |
| JP | 2017142486 | A | 8/2017 |
| JP | 2020522749 | A | 7/2020 |
| KR | 20100100560 | A | 9/2010 |
| KR | 20200075371 | A | 6/2020 |
| WO | 2017136641 | A1 | 8/2017 |
| WO | 2018148631 | A1 | 8/2018 |
| WO | 2021034888 | A1 | 2/2021 |

OTHER PUBLICATIONS

Yaqing. Confinement of gold quantum dot arrays inside ordered mesoporous silica thin film. Journal of Semiconductors vol. 30, No. 12. Dec. 2009. p. 122001 1-4 (Year: 2009).*
Wikipedia. Mesoporous Material. https://en.wikipedia.org/wiki/Mesoporous_material. retrieved on Mar. 20, 2025 (Year: 2025).*
Chinese Office Action issued in corresponding Chinese Patent Application No. 202210037320.9 dated May 16, 2023, pp. 1-10.
Chinese Rejection Decision issued in corresponding Chinese Patent Application No. 202210037320.9 dated Sep. 18, 2023, pp. 1-8.
Japanese Office Action issued in corresponding Japanese Patent Application No. 特願2022-505370 dated Feb. 20, 2024, pp. 1-3.
«Nature communications» vol. 12 Jul. 29, 2021 Jinyang Zhao, ETC. Large-area patterning of full-color quantum dot arrays beyond 1000 pixels per inch by selective electrophoretic deposition p. 4606.
«New Display Technology» Gao Hongjin, etc. New display technology.
Chinese Office Action issued in corresponding Chinese Patent Application No. 202210037320.9 dated Sep. 13, 2022, pp. 1-29.
International Search Report in International application No. PCT/CN2022/072794,mailed on Jul. 27, 2022.
Written Opinion of the International Search Authority in International application No. PCT/CN2022/072794,mailed on Jul. 27, 2022.

* cited by examiner

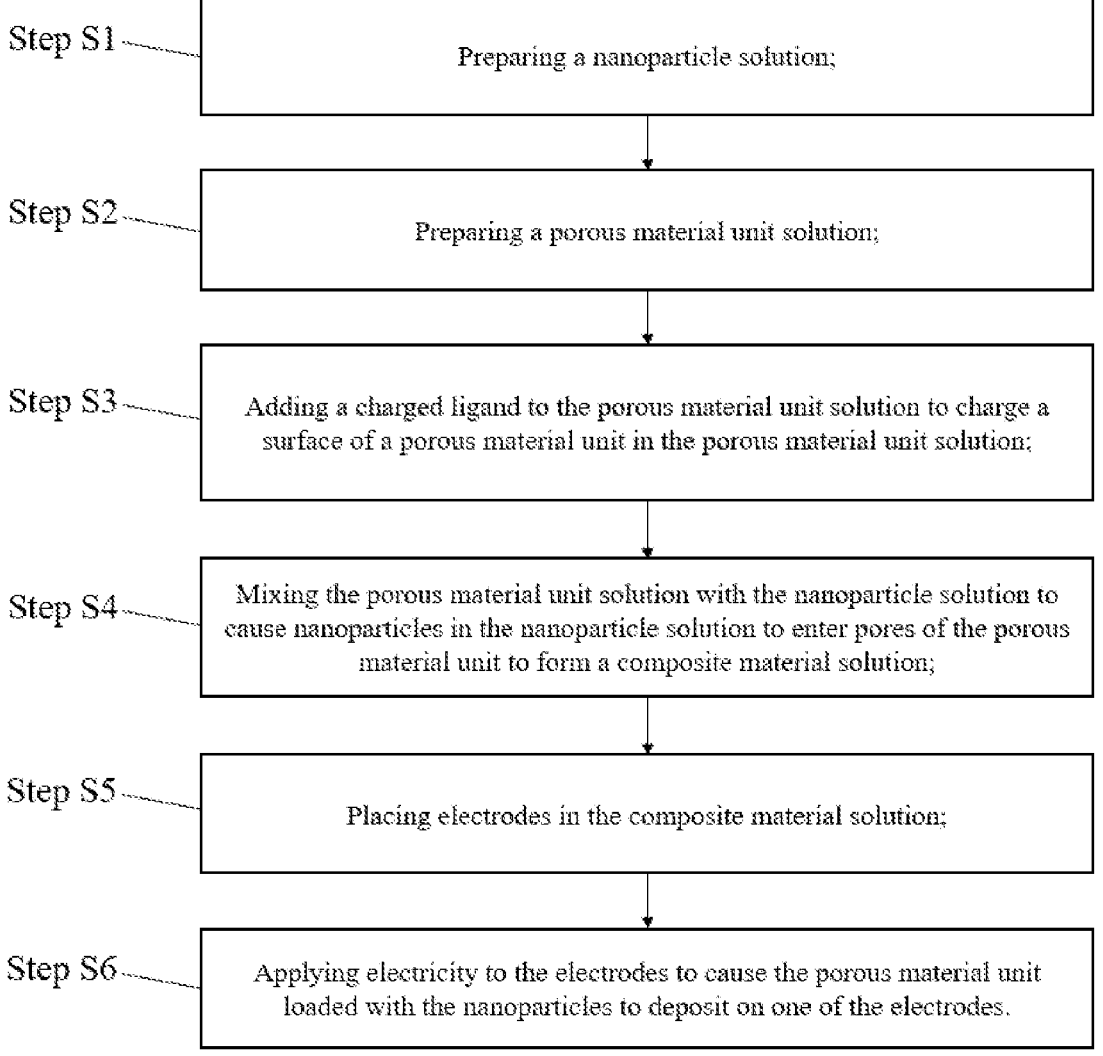

Step S1 — Preparing a nanoparticle solution;

Step S2 — Preparing a porous material unit solution;

Step S3 — Adding a charged ligand to the porous material unit solution to charge a surface of a porous material unit in the porous material unit solution;

Step S4 — Mixing the porous material unit solution with the nanoparticle solution to cause nanoparticles in the nanoparticle solution to enter pores of the porous material unit to form a composite material solution;

Step S5 — Placing electrodes in the composite material solution;

Step S6 — Applying electricity to the electrodes to cause the porous material unit loaded with the nanoparticles to deposit on one of the electrodes.

COMPOSITE MATERIAL FILM, MANUFACTURING METHOD THEREOF, AND DISPLAY PANEL

FIELD OF INVENTION

The present invention relates to a field of display technology and particularly relates to a composite material film, a manufacturing method thereof, and a display panel.

BACKGROUND OF INVENTION

Nanoscale material refer to materials with structural units ranging in size from 1 nanometer to 100 nanometers. Because a size of nanoscale material is close to a coherence length of an electron, its properties are greatly changed due to self-organization caused by a strong coherence. Furthermore, because its scale is close to wavelength of light, it has volume effect, surface effect, quantum size effect, and macroscopic quantum tunneling effect, etc., so that it has unique properties in melting point, magnetism, optics, thermal conductivity, and electrical conductivity. Therefore, it has extremely important application value in various fields.

Quantum dot (QD) material is a typical nanoscale material with high energy conversion efficiency. Particularly, quantum dot materials have very important application prospects in technical fields such as lighting, display technology, solar cells, sensors, and detection. In addition, quantum dot materials also have characteristics of high brightness, narrow emission spectrum, adjustable emission color, and great stability, which meet the characteristics of ultra-thin, high brightness, high color gamut, and high color saturation required in the display technology field. Therefore, it has become a promising new material for display technology in recent years.

TECHNICAL PROBLEM

The current patterning technology of a composite material film mainly adopts a photolithography process or inkjet printing technology. Because heating procedures and developing procedures such as ultraviolet light curing in a lithography procedure will affect the stability of quantum dots. In addition, the inkjet printing technology does not yet have a mature and stable mass production system, its reproducibility is poor, and manufacturing time is too long. These problems greatly limit the development and application of patterning technology for the composite material film. Due to a self-absorption effect of quantum dots, the photoluminescence efficiency of a film formed by individual quantum dot materials is low, which limits a further application of the quantum dot material film. In addition, the low charge of quantum dots also limits the application of electrodeposition technology in the manufacturing of composite material film. Therefore, the technical problem of manufacturing composite material films needs to be further solved.

SUMMARY OF INVENTION

In order to solve the above problems, the present invention provides a composite material film, a manufacturing method thereof, and a display panel. In the present invention, the porous material unit is used to be a carrier, and pores of the porous material unit are loaded with nanoparticles or organic small molecules. Furthermore, the surface of the porous material unit is chemically modified with ligands to cause the surface charged, and they are deposited on an electrode plate by an electrodeposition method so that a composite material thin film is formed. This method can not only electrodeposit uncharged nanomaterials, such as quantum dot nanoparticles but also reduce the voltage required for electrodeposition. In addition, when the porous material is used to be a carrier to load quantum dot nanoparticles to form a quantum dot composite material film, the self-absorption effect of quantum dots can be effectively reduced due to the spacing effect and scattering effect of the porous material. Therefore, the luminous efficiency of the quantum dot composite material film is higher than that of the film composed of only quantum dots. Furthermore, because nanomaterials such as quantum dot nanoparticles do not need to be modified to increase their charge, their good optoelectronic properties can be maintained.

The present invention provides a composite material film, and the composite material film includes: at least one film layer including porous material units, wherein a surface of the porous material unit has pores loaded with nanoparticles or small organic molecules; wherein a pore size of the pore matches a particle size of each nanoparticle or a size of the small organic molecule.

In the composite material film according to an embodiment of the present invention, the surface of the porous material unit is grafted with ligands.

In the composite material film according to an embodiment of the present invention, the porous material unit includes at least one of mesoporous silica, a mesoporous carbon molecular sieve, or a mesoporous metal oxide.

In the composite material film according to an embodiment of the present invention, the nanoparticles include quantum dot nanoparticles, and wherein the quantum dot nanoparticles include at least one of $ZnCdSe_2$, InP, $Cd_2Se$, CdSe, $Cd_2SeTe$, or InAs, and at least one of CdS, ZnSe, $ZnCdSe_2$, ZnS, or ZnO.

In the composite material film according to an embodiment of the present invention, the ligands include at least one of amine-based ligands, thiol-based ligands, carboxylic acid-based ligands, or phosphorus ligands.

In the composite material film according to an embodiment of the present invention, the ligands include a surfactant.

In the composite material film according to an embodiment of the present invention, the surfactant includes at least one of organic sulfate, hexadecyl trimethyl ammonium bromide, metal soap, organic amine, organic phosphate, or phosphoric acid ester.

In the composite material film according to an embodiment of the present invention, the organic sulfate includes at least one of calcium dodecylbenzene sulfonate, sodium dodecylbenzene sulfonate, or barium dinonylnaphthalenesulfonate.

In the composite material film according to an embodiment of the present invention, the metal soap includes at least one of metal naphthoate or stearate.

In the composite material film according to an embodiment of the present invention, the surfactant includes an ionic surfactant.

In the composite material film according to an embodiment of the present invention, the ionic surfactant includes at least one of sodium dodecyl benzene sulfonate, phosphate ester surfactant, or hexadecyl trimethyl ammonium bromide.

In the composite material film according to an embodiment of the present invention, a size of the porous material unit ranges from 50 nm to 1000 nm, the pore size ranges from 2 nm to 50 nm, and the particle size of the nanoparticle or the size of the small organic molecule ranges from 2 nm to 50 nm.

In the composite material film according to an embodiment of the present invention, a mass ratio of the nanoparticle or the small organic molecule to the porous material unit ranges from 10:1 to 1:100.

The manufacturing method of the composite material film includes: preparing a nanoparticle solution; preparing a porous material unit solution; adding a charged ligand to the porous material unit solution to charge a surface of a porous material unit in the porous material unit solution; mixing the porous material unit solution with the nanoparticle solution to cause nanoparticles in the nanoparticle solution to enter pores of the porous material unit to form a composite material solution; placing electrodes in the composite material solution; and applying electricity to the electrodes to cause the porous material unit loaded with the nanoparticles to deposit on one of the electrodes.

In the manufacturing method of the composite material film according to an embodiment of the present invention, the porous material unit is selected from at least one of mesoporous silica, a mesoporous carbon molecular sieve, or a mesoporous metal oxide.

In the manufacturing method of the composite material film according to an embodiment of the present invention, the porous material unit solution is prepared with a non-polar solvent, and the charged ligand is selected from ionic surfactants.

The present invention further provides a display panel. The display panel includes: a substrate; a thin film transistor device layer disposed on the substrate; an anode layer disposed on the thin film transistor device layer; a light-emitting functional layer disposed on the anode layer; a cathode layer disposed on the light-emitting functional layer; and an encapsulation layer disposed on the cathode layer; wherein the light-emitting functional layer includes a composite material film. The composite material film includes: at least one film layer including porous material units, wherein a surface of the porous material unit has pores loaded with quantum dot nanoparticles; and wherein a pore size of the pore matches a particle size of the quantum dot nanoparticle.

In the display panel according to an embodiment of the present invention, the surface of the porous material unit is grafted with ligands.

In the display panel according to an embodiment of the present invention, the porous material unit includes at least one of mesoporous silica, a mesoporous carbon molecular sieve, or a mesoporous metal oxide.

In the display panel according to an embodiment of the present invention, the ligands include at least one of amine-based ligands, thiol-based ligands, carboxylic acid-based ligands, or phosphorus ligands.

BENEFICIAL EFFECT

In the present invention, the porous material is used to be a carrier, and a surface of the porous material is modified by ligands to cause the surface charged, wherein pores of the porous material are loaded with quantum dots or other nanomaterials, and they are co-deposited on an electrode plate by an electrodeposition method to form a composite material film. This method can not only electrodeposit uncharged nanomaterials, such as uncharged quantum dot nanoparticles but also reduce the voltage required for the electrodeposition. Specifically, when the porous material is used to be a carrier to load quantum dot nanoparticles to form a quantum dot composite material film, the self-absorption effect of quantum dots can be effectively reduced due to the spacing effect and scattering effect of the porous material. Therefore, the luminous efficiency of the quantum dot composite material film is higher than that of the film composed of only quantum dots. Furthermore, because nanomaterials such as quantum dot nanoparticles do not need to be modified to increase their charge, their good optoelectronic properties can be maintained.

DESCRIPTION OF DRAWINGS

FIG. 3 is a flow chart of a manufacturing method of a composite material film according to an embodiment of the present invention.

DETAILED DESCRIPTION OF PREFERRED EMBODIMENTS

Figure 1:
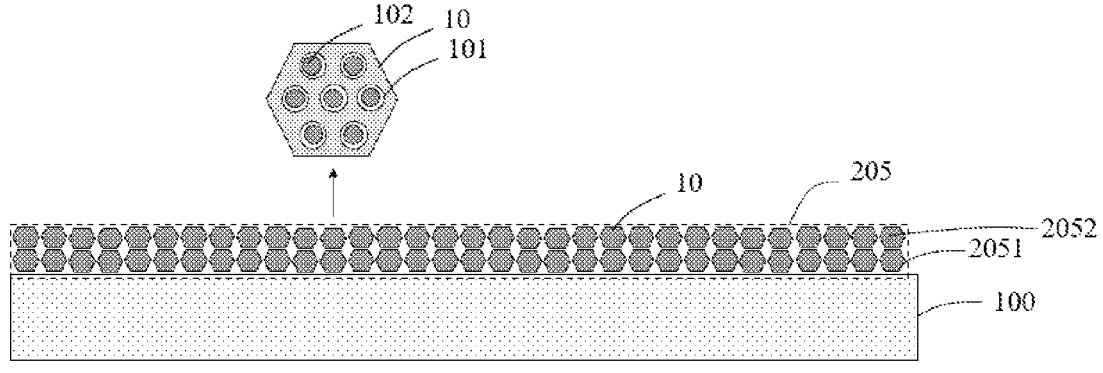
FIG. 1 is a schematic structural diagram of a composite material film according to an embodiment of the present invention.

The composite material film provided by the embodiments of the present invention will be described in detail with reference to the accompanying drawings. Obviously, the embodiments are only part of the embodiments of the present invention, rather than all the embodiments. Based on these embodiments of the present invention, all other embodiments obtained by those of ordinary skill in the art without doing creative work shall fall within the protection scope of the present invention.

The description of the following embodiments refers to the attached drawings to illustrate specific embodiments in the present application. The directional terms mentioned in the present invention, such as "above", "below", "front", "back", "left", "right", "inside", "outside", "side", etc., are only directions for referring to the attached drawings. Therefore, the directional terms are used to describe and understand the present invention, rather than limit the present invention. In the drawings, units with similar structures are denoted by the same reference numerals. In the drawings, for clear understanding and ease of description, the thickness of some layers and regions are exaggerated. That is, the size and thickness of each component shown in the drawings are arbitrarily shown, but the present application is not limited thereto.

Please refer to FIG. 1, which is a schematic structural diagram of a composite material film according to an embodiment of the present invention. As shown in FIG. 1, a composite material film 205 is electrodeposited on an electrode 100. The composite material film 205 includes a first film layer 2051 and a second film layer 2052, and the first film layer 2051 and the second film layer 2052 include the stacked porous material units 10. The surface of the porous material unit 10 has pores 101 loaded with nanoparticles 102 (or small organic molecules), wherein a pore size of the pore 101 matches a particle size of the nanoparticle 102 (or a size of the small organic molecule). Specifically, the surface of the porous material unit 10 is grafted with ligands.

The pore size of the pores 101 matches the size of the nanoparticles 102 means that the pore size of the pores 101 is close to the particle size of the nanoparticles 102 but cannot be smaller than the size of the nanoparticles 102. That is, the pore size of pores 101 is slightly larger than the particle size of the nanoparticles 102. Preferably, the pore size of pores 101 is between 1.01 and 1.25 times the particle size of the nanoparticles 102.

That the surface of the porous material unit 10 is grafted with ligands means that the ligands are attached to the surface of the porous material unit through chemical bonds.

Specifically, in one embodiment, the porous material unit 10 is a mesoporous silica (SBA-15 type) porous material unit, and the porous material unit 10 may also be a mesoporous carbon molecular sieve or a mesoporous metal oxide. Specifically, the porous material unit may be Mobil composition of matter (MCM) series, Santa Barbara amorphous (SBA) series, Folded sheets mesoporous (FSM) series, hexagonal mesoporous silica (HMS) series, or Michigan state university (MSU) series of molecular sieves. The porous material unit may be a mesoporous carbon molecular sieve or a mesoporous metal oxide. The mesoporous metal oxide is, for example, titanium oxide mesoporous, zirconium oxide mesoporous, tungsten oxide mesoporous, or barium titanate mesoporous. In this embodiment, the porous material unit 10 is the mesoporous silica (SBA-15 type), which is taken as an example for description.

Specifically, the nanoparticles 102 loaded in the pores 101 are CdSe/ZnS quantum dot nanoparticles. As mentioned above, pores 101 may also load other nanoparticles or small organic molecules. In this embodiment, the nanoparticles loaded in the pores 101 are CdSe/ZnS quantum dot nanoparticles, which is taken as an example for description.

Figure 2:
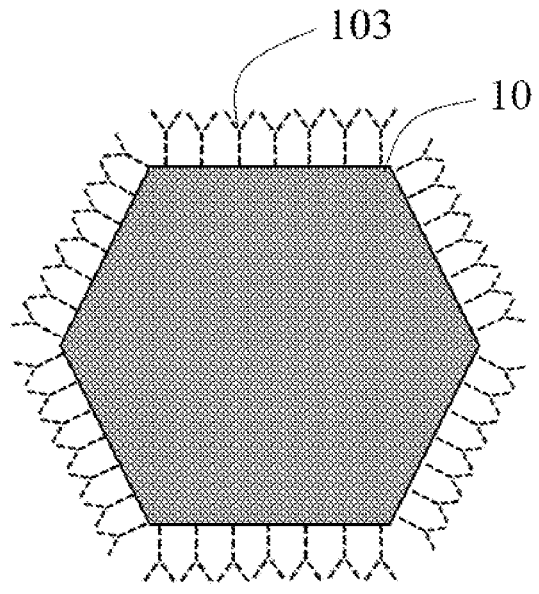
FIG. 2 is a schematic diagram of ligands grafted on a surface of a porous material unit according to an embodiment of the present invention.

Continuing from the above, please refer to FIG. 2, which is a schematic diagram of ligands grafted on a surface of a porous material unit according to an embodiment of the present invention. As shown in FIG. 2, the surface of the porous material unit 10 is grafted with ligands 103. That is, ligands 103 are attached to the surface of the porous material unit 10 through chemical bonds. Specifically, ligand 103 can be a surfactant. The surfactant may be an organic sulfate, hexadecyl trimethyl ammonium bromide, metal soap, organic amine, organic phosphate, or phosphoric acid ester. The organic sulfate can be calcium dodecylbenzene sulfonate, sodium dodecylbenzene sulfonate, or barium dinonylnaphthalenesulfonate. The metal soap can be a metal naphthoate or a stearate, and the organic amine can be an N-vinylpyrrolidone polymer.

In another embodiment, the surfactant is an ionic surfactant. The ionic surfactant can be sodium dodecyl benzene sulfonate, phosphate ester surfactant, or hexadecyl trimethyl ammonium bromide (cetyltrimethylammonium bromide, CTAB).

Specifically, in this embodiment, the size of the mesoporous silica ranges from 50 nm to 1000 nm, the pore size of the pore 101 of the mesoporous silica ranges from 2 nm to 50 nm, and the particle size of the CdSe/ZnS quantum dot nanoparticle ranges from 2 nm to 50 nm.

Specifically, in this embodiment, the mass ratio of quantum dot nanoparticle to the mesoporous silica ranges from 10:1 to 1:100. For example, the mass ratio of the quantum dot nanoparticles to the mesoporous silica may be 9:1, 6:1, 1:1, 1:10, or 1:99.

Please refer to FIG. 3, which is a flow chart of a manufacturing method of a composite material film according to an embodiment of the present invention. As shown in FIG. 3, the process of the manufacturing method of the composite material film includes:

Step S1, preparing a nanoparticle solution.

Step S2, preparing a porous material unit solution.

Step S3, adding a charged ligand to the porous material unit solution to charge a surface of a porous material unit in the porous material unit solution.

Step S4, mixing the porous material unit solution with the nanoparticle solution to cause nanoparticles in the nanoparticle solution to enter pores of the porous material unit to form a composite material solution.

Step S5, placing electrodes in the composite material solution.

Step S6, applying electricity to the electrodes to cause the porous material unit loaded with the nanoparticles to deposit on one of the electrodes.

Specifically, the nanoparticle solution in step S1 may be a quantum dot nanoparticle solution. The preparation material of the quantum dot nanoparticle is selected from at least one of $ZnCdSe_2$, InP, $Cd_2Se$, CdSe, $Cd_2SeTe$, or InAs that forms the quantum dot light-emitting core, and at least one of CdS, ZnSe, $ZnCdSe_2$, ZnS, or ZnO that forms the quantum dot light-emitting shell. In this embodiment, the nanoparticles are CdSe/ZnS quantum dot nanoparticles.

Specifically, the porous material unit in the porous material unit solution in the step S2 can be selected from molecular sieves such as Mobil composition of matter (MCM) series, Santa barbara amorphous (SBA) series, Folded sheets mesoporous (FSM) series, hexagonal mesoporous silica (HMS) series, or Michigan state university (MSU) series. The porous material unit may be selected from mesoporous silica, mesoporous carbon molecular sieves, or mesoporous metal oxides. Wherein the mesoporous metal oxide is, for example, titanium oxide mesoporous, zirconium oxide mesoporous, tungsten oxide mesoporous, or barium titanate mesoporous. In this embodiment, the porous material unit is SBA-15 type mesoporous silica. The synthesis process of the SBA-15 type mesoporous silica is as follows:

The triblock surfactant P123 (Aldrich, EO20PO70E)20, Ma=5800) is dissolved in an appropriate amount of deionized water at 35 to 40° C. Ethyl orthosilicate (TEOS) and hydrochloric acid (HCl) are added thereto, and the stirring is continuously performed for more than 24 hours. Then put them into a polytetrafluoroethylene bottle to crystallize for more than 24 hours, then filtering, washing, and drying are performed. Finally, it is calcined at 550° C. for more than 5 hours to remove the templating agent, and then filtering, washing, and drying are performed to obtain the white powder SBA-15 type mesoporous silica.

Specifically, the properties of the charged ligand in the step S3 are mainly determined by its free end. If the free end of the charged ligand is positively charged, the charged ligand is a positively charged ligand, and if the free end of the ligand is negatively charged, the charged ligand is a negatively charged ligand. The charged ligands may be selected from surfactants. The surfactants are, for example, surfactants such as organic sulfates, CTAB, metal soaps, organic amines, organic phosphates, or phosphate esters. Wherein, the organic sulfate is, for example, calcium dodecylbenzene sulfonate, sodium dodecylbenzene sulfonate, or barium dinonylnaphthalenesulfonate, etc. The metal soap is, for example, metal naphthoate or stearate, and the organic amine is, for example, N-vinylpyrrolidone polymer. The charged ligand can also be an amine-based ligand, a thiol-based ligand, a carboxylic acid-based ligand, or a phosphorus ligand.

Specifically, the mixing of the porous material unit solution and the nanoparticle solution in the step S4 can be performed by ultrasonic stirring.

Specifically, the electrode in the step S5 is an indium tin oxide (ITO) electrode.

Specifically, the energization voltage in the step S6 ranges from 10V to 100V, the energization time ranges from 10 to 300 seconds. The energization voltage and energization time are determined according to the type of the surfactant or ligand used, the type and the thickness of the composite material film to be formed.

Figure 4:
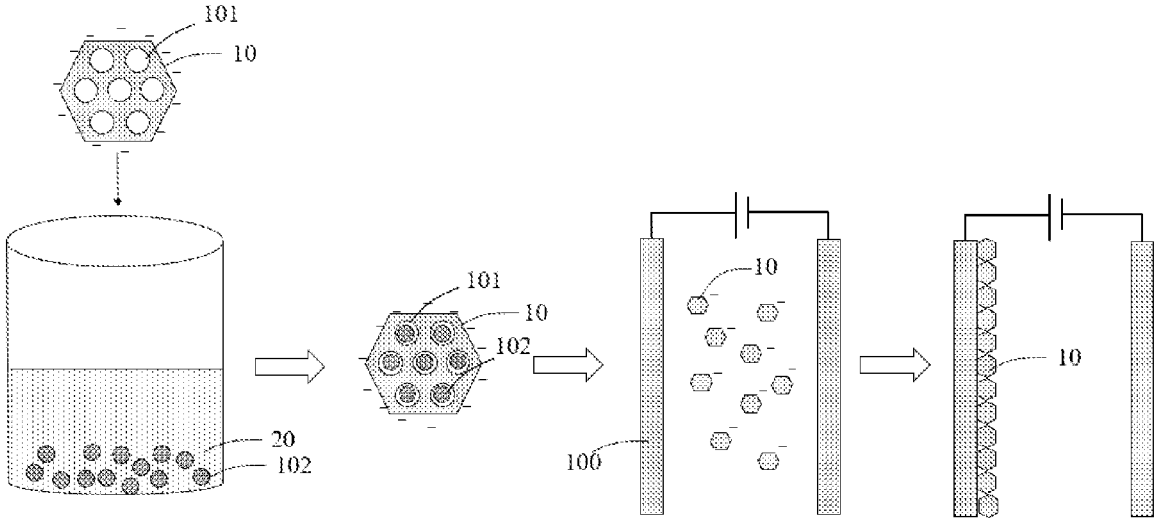
FIG. 4 is a schematic diagram of a manufacturing method of a composite material film according to a first embodiment of the present invention.

Please refer to FIG. 4, which is a schematic diagram of a manufacturing method of a composite material film according to a first embodiment of the present invention. As shown in FIG. 4, in this embodiment, the porous material used is SBA-15 type mesoporous silica.

First, preparing the CdSe/ZnS quantum dot solution 20, the preparation of CdSe/ZnS quantum dot solution 20 includes the following steps (detailed steps are not shown by the figure):

Preparing 5 ml of deionized water, stirring, and adding 0.19 mmol NaOH thereto under nitrogen ($N_2$) for 10 minutes. Adding 0.035 mmol of Se powder, then adding 0.051 mmol of aluminum (Al) powder after 10 minutes of the reaction, heating the solution to 85° C., and ultrasonic mixing is performed for 25 minutes to obtain a clear NaSe precursor solution. The cadmium perchlorate of 0.12 mmol is dissolved in 50 ml deionized water, then the methionine of 0.120 mmol and the mercaptopropionic acid of 0.125 mmol are added under stirring, and the solution is adjusted to have a pH value range from 8.5 to 9.0 with the NaOH of mass fraction of 10%. Stirring the solution at room temperature for 10 minutes, adding $Na_2Se$ precursor solution, the temperature is raised to 85° C., and ultrasonic mixing is performed for 25 minutes to obtain CdSe nuclear quantum dot solution 20. Adding 0.110 mmol of methionine and 0.110 mmol of mercaptopropionic acid to the CdSe nuclear quantum dot solution 20, and keeping the solution at 85° C. for 10 minutes, while 4.5 ml of 0.001 mol/l thioacetamide solution and 3.0 ml of 0.05 mol/l zinc chloride solution are added dropwise for 5 minutes. Ultrasonic mixing is performed at 85° C. for 20 minutes to obtain CdSe/ZnS core-shell quantum dot solution 20. The obtained CdSe/ZnS core-shell quantum dot solution 20 is cooled to room temperature, precipitated with acetone, centrifuged, and repeated 3 times, and the purified quantum dots are placed in a 4° C. environment to avoid light and stored for later use.

Following this, an SBA-15 type mesoporous silica solution is prepared (not shown in the figure). The SBA-15 type mesoporous silica solution includes the SBA-15 type mesoporous silica 10. The synthesis process of the SBA-15 type mesoporous silica 10 is as follows:

The triblock surfactant P123 (Aldrich, EO20PO70EO20, Ma=5800) is dissolved in an appropriate amount of deionized water at 35 to 40° C. Ethyl orthosilicate (TEOS) and hydrochloric acid (HCl) are added thereto, and the stirring is continuously performed for more than 24 hours. Then put them into a polytetrafluoroethylene bottle to crystallize for more than 24 hours, then filtering, washing, and drying are performed. Finally, it is calcined at 550° C. for more than 5 hours to remove the templating agent, and then filtering, washing, and drying are performed to obtain the white powder SBA-15 type mesoporous silica. Following, the SBA-15 type mesoporous silica is dissolved in a non-polar solvent. Ligands (not shown) are added to the SBA-15-type mesoporous silica material solution to modify the porous material to charge its surface. The ligand may be an amine-based ligand, a thiol-based ligand, a carboxylic acid-based ligand, or a phosphorus ligand. The ligand can also be a surfactant, such as calcium dodecyl benzenesulfonate, sodium dodecyl benzenesulfonate, barium dinonylnaphtha-lenesulfonate, cetyltrimethylammonium bromide, naph-thoate, stearate, N-ethylene based pyrrolidone polymers, organophosphates, or phosphate ester surfactants. The ligands are determined by the solvent being prepared and by which the porous material unit is to be positively or negatively charged. It should be noted that when non-polar solvents are used, general ligands are difficult to ionize, so ionic surfactants need to be used. For example, sodium dodecyl benzenesulfonate, phosphate ester surfactants, hexadecyl trimethyl ammonium bromide (cetyltrimethylam-monium bromide, CTAB), etc. When the surfactant exceeds a critical concentration, the surfactant molecules aggregate to form reverse micelles. The polar part of the surfactant faces inward, forming a polar nucleus, which most likely contains some water or other impurities. The ends of the non-polar surfactant face outward towards the non-polar solvent. Therefore, ions ionized from the surfactant can exist in the polar core of the reverse micelle, the surfactant is thereby allowed to ionize, and the ionized surfactant is adsorbed to the surface of the mesoporous material, thereby charging the entire SBA-15 type mesoporous silica 10. The higher the surfactant concentration, the more reverse micelles can be formed, the more the surfactant is ionized, and the more charged surfactant can be adsorbed on the surface of SBA-15 mesoporous silica 10. Therefore, the charge amount of the SBA-15 type mesoporous silica 10 is increased. For example, modifying the surface of SBA-15 type mesoporous silica 10 with CTAB, carboxyl-based ligands, or amine-based ligands can increase its charge, thereby reducing the voltage of electrodeposition.

Then, the SBA-15 type mesoporous silica material solution and the CdSe/ZnS core-shell quantum dot solution 20 are stirred or ultrasonically mixed for 6 to 9 hours to cause the CdSe/ZnS core-shell quantum dots 102 in the CdSe/ZnS core-shell quantum dot solution 20 to enter the pores 101 of the SBA-15 mesoporous silica material 10. Thus, a composite material solution is formed. Following, an electrode 100 is placed in the composite material solution. Specifically, the electrode 100 is an indium tin oxide (ITO) electrode. Specifically, the mass ratio of the CdSe/ZnS core-shell quantum dots 102 to the SBA-15 type mesoporous silica material 10 ranges from 10:1 to 1:100.

Finally, the electrode 100 is energized to deposit the SBA-15 type mesoporous silica material 10 loading the CdSe/ZnS core-shell quantum dots 102 on a positive electrode plate or a negative electrode plate of the electrode 100 until a composite material film is formed. Specifically, the energization voltage ranges from 10V to 100V, the energization time ranges from 10 seconds to 300 seconds. The energization voltage and energization time are determined according to the type of the surfactant or ligand used, the type and the thickness of the composite material film to be formed.

Figure 5:
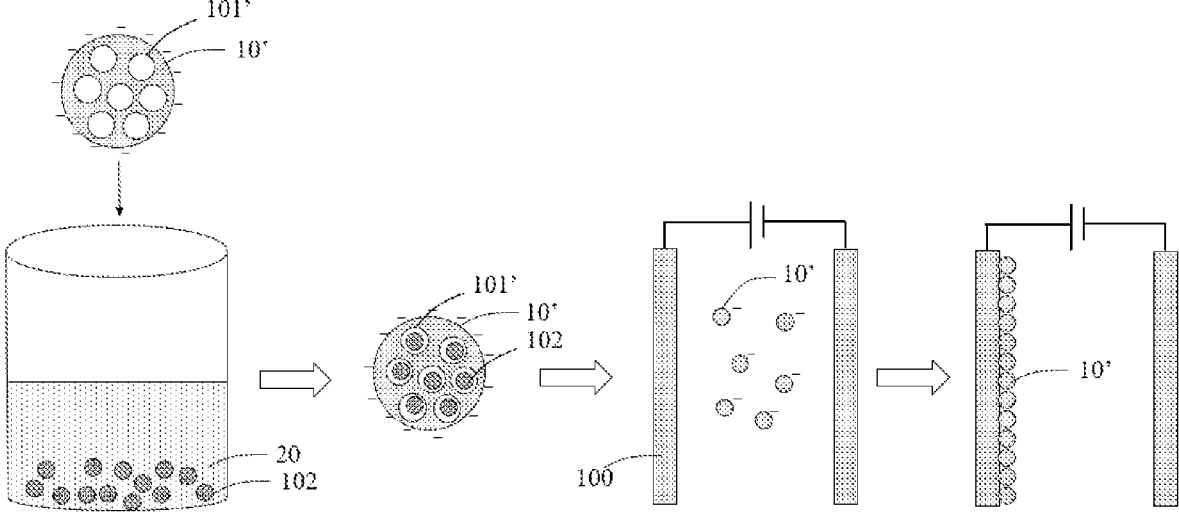
FIG. 5 is a schematic diagram of a manufacturing method of a composite material film according to a second embodiment of the present invention.

Please refer to FIG. 5, which is a schematic diagram of a manufacturing method of a composite material film according to a second embodiment of the present invention. As shown in FIG. 5, in this embodiment, the porous material used is a mesoporous silica microsphere material 10'.

First, preparing the CdSe/ZnS quantum dot solution 20, the preparation of the CdSe/ZnS quantum dot solution 20 includes the following steps as previously described (detailed steps are not shown by the figure):

Preparing 5 ml of deionized water, stirring, adding 0.19 mmol NaOH thereto under nitrogen ($N_2$) for 10 minutes. Adding 0.035 mmol of Se powder, then adding 0.051 mmol of aluminum (Al) powder after 10 minutes of the reaction, heating the solution to 85° C., and ultrasonic mixing is performed for 25 minutes to obtain a clear NaSe precursor solution. The cadmium perchlorate of 0.12 mmol is dissolved in 50 ml of deionized water, the methionine of 0.120 mmol and the mercaptopropionic acid of 0.125 mmol are added under stirring, and the solution is adjusted to have a pH value range from 8.5 to 9.0 with the NaOH of mass fraction of 10%. Stirring the solution at room temperature for 10 minutes, adding Na2Se precursor solution, the temperature is raised to 85° C., and ultrasonic mixing is performed for 25 minutes to obtain the CdSe nuclear quantum dot solution 20. Adding 0.110 mmol of methionine and 0.110 mmol of mercaptopropionic acid to the CdSe nuclear quantum dot solution 20, and keeping the solution at 85° C. for 10 minutes, while 4.5 ml of 0.01 mol/l thioacetamide solution and 3.0 ml of 0.05 mol/l zinc chloride solution are added dropwise for 5 minutes. Ultrasonic mixing is performed at 85° C. for 20 minutes to obtain the CdSe/ZnS core-shell quantum dot solution 20. The obtained CdSe/ZnS core-shell quantum dot solution is cooled to room temperature, precipitated with acetone, centrifuged, and repeated 3 times, and the purified quantum dots are placed in a 4° C. environment to avoid light and stored for later use.

Following this, a porous material solution is prepared (not shown in the figure). The porous material solution includes a mesoporous silica microsphere material 10' selected from commercially available mesoporous silica microsphere materials. The mesoporous silica microsphere material is formulated into a solution, and then a ligand (not shown in the figure) is added to the mesoporous silica microsphere material solution to modify the porous material to charge its surface. The ligand may be an amine-based ligand, a thiol-based ligand, a carboxylic acid-based ligand, or a phosphorus ligand. The ligand can also be a surfactant, such as calcium dodecyl benzenesulfonate, sodium dodecyl benzenesulfonate, barium dinonylnaphthalenesulfonate, cetyltrimethylammonium bromide, naphthoate, stearate, N-ethylene based pyrrolidone polymers, organophosphates, or phosphate ester surfactants. The ligands are determined by the solvent being prepared and by which the porous material unit is to be positively or negatively charged. It should be noted that when non-polar solvents are used, general ligands are difficult to ionize, so ionic surfactants need to be used. For example, sodium dodecyl benzenesulfonate, phosphate ester surfactants, hexadecyl trimethyl ammonium bromide (cetyltrimethylammonium bromide, CTAB), etc. When the surfactant exceeds a critical concentration, the surfactant molecules aggregate to form reverse micelles. The polar part of the surfactant faces inward, forming a polar nucleus, which most likely contains some water or other impurities. The ends of the non-polar surfactant face outward towards the non-polar solvent. Therefore, ions ionized from the surfactant can exist in the polar core of the reverse micelle, the surfactant is thereby allowed to ionize, and the ionized surfactant is adsorbed to the surface of the mesoporous material, thereby charging the entire mesoporous silica microsphere material 10'. The higher the surfactant concentration, the more reverse micelles can be formed, the more the surfactant is ionized, and the more charged surfactant can be adsorbed on the surface of the mesoporous silica microsphere material 10'. Therefore, the charge amount of the mesoporous silica microsphere material 10' is increased. In addition, modification on the surface of the mesoporous silica microspheres 10' with CTAB, carboxyl-based ligands, amine-based ligands, etc. can increase its charge, thereby reducing the voltage of electrodeposition.

Then, the mesoporous silica microsphere material solution and the CdSe/ZnS core-shell quantum dot solution 20 are stirred or ultrasonically mixed for 6 to 9 hours to cause the CdSe/ZnS core-shell quantum dots 102 in the CdSe/ZnS core-shell quantum dot solution 20 to enter the pores 101' of the mesoporous silica microsphere material 10'. Thus, a composite material solution is formed.

Following, an electrode 100 is placed in the composite material solution. Specifically, the electrode 100 is an indium tin oxide (ITO) electrode. Specifically, the mass ratio of the CdSe/ZnS core-shell quantum dots 102 to the mesoporous silica microsphere material 10' ranges from 10:1 to 1:100.

Finally, the electrode 100 is energized to deposit the mesoporous silica microsphere material 10' loading the CdSe/ZnS core-shell quantum dots 102 on a positive electrode plate or a negative electrode plate of the electrode 100 until a composite material film is formed. Specifically, the energization voltage ranges from 10V to 100V, the energization time ranges from 10 seconds to 300 seconds.

Figure 6:
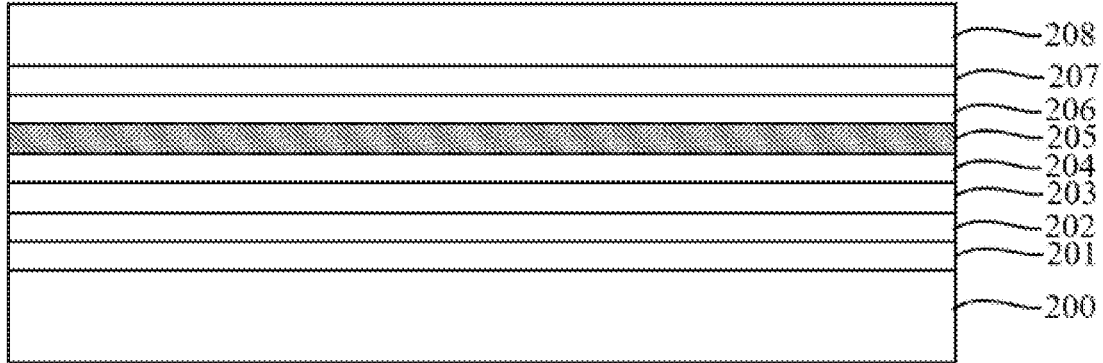
FIG. 6 is a schematic cross-sectional view of a display panel according to an embodiment of the present invention.

Please refer to FIG. 6, which is a schematic cross-sectional view of a display panel according to an embodiment of the present invention. As shown in FIG. 6, the display panel includes a substrate 200, a thin film transistor device layer 201, an anode layer 202, light-emitting functional layers (203, 204, 205, 206), a cathode layer 207, and an encapsulation layer 208. The thin film transistor device layer 201 is disposed on the substrate 200. The anode layer 202 is disposed on the thin film transistor device layer 201, the light-emitting functional layers (203, 204, 205, 206) are disposed on the anode layer 202, the cathode layer 307 is disposed on the light-emitting functional layer (203, 204, 205, 206), and the encapsulation layer 208 is disposed on the cathode layer 207.

Specifically, the light-emitting functional layer (203, 204, 205, 206) includes a hole injection layer 203, a hole transport layer 204, a composite material film 205, and an electron transport layer 206. Please refer to FIG. 1 and FIG. 2 together, the composite material film 205 includes a first film layer 2051 and a second film layer 2052, and the first film layer 2051 and the second film layer 2052 include the stacked porous material units 10. The surface of the porous material unit 10 has pores 101 loaded with quantum dot nanoparticles 102, wherein a pore size of the pore 101 matches a particle size of the quantum dot nanoparticles 102. Specifically, the surface of the porous material unit 10 is grafted with ligands. Specifically, the ligand 103 can be an amine-based ligand, a thiol-based ligand, a carboxylic acid-based ligand, or a phosphorus ligand.

Please refer to Table 1, which shows the performance experimental data of a conventional individual quantum dot film, the SBA-15 type mesoporous silica/CdSe/ZnS quantum dot film of the first embodiment of the present invention, and mesoporous silica microsphere/CdSe/ZnS quantum dot film according to the second embodiment of the present invention.

As shown in Table 1: The conventional individual quantum dot film, the SBA-15 type mesoporous silica/CdSe/ZnS quantum dot film of the first embodiment of the present invention, and the mesoporous silica microsphere/CdSe/ZnS quantum dot film according to the second embodiment of the present invention are similar in the performance of blue light brightness.

TABLE 1

|  | Individual QD film | SBA-15 type mesoporous silica/CdSe/ZnS QD film | Mesoporous silica microsphere/CdSe/ZnS QD film |
|---|---|---|---|
| Blue light brightness | 635.4 | 587.9 | 616.7 |
| Red light brightness | 164.4 | 231.1 | 220.8 |
| Luminous efficiency | 37.10% | 47.30% | 47.80% |

However, they differ significantly in red light performance. The performance of the above three is 164.4 cd/m$^2$, 231.1 cd/m$^2$, and 220.8 cd/m$^2$, respectively. It can be clearly seen that compared with the individual CdSe/ZnS quantum dot film, the performance of the SBA-15 type mesoporous silica/CdSe/ZnS quantum dot film as a carrier of the quantum dots and the performance of the mesoporous silica microsphere/CdSe/ZnS quantum dot film as a carrier of the quantum dots are obviously better than that of the individual CdSe/ZnS quantum dot film in red light brightness. Their performance in red light brightness is improved by more than 30 to 40%.

In addition, the luminous efficiency of the composite material film in the first embodiment and the second embodiment of the present invention are 47.30% and 47.80%, respectively, which are also significantly better than the luminous efficiency of the individual CdSe/ZnS quantum dot film, which is 37.10%.

As mentioned above, in the present invention, the porous material is used to be a carrier, and the surface of the porous material is modified by ligands to cause the surface charged, wherein pores of the porous material are loaded with quantum dots or other nanomaterials, and they are co-deposited on an electrode plate by an electrodeposition method to form a composite material film. This method can not only electrodeposit uncharged nanomaterials, such as uncharged quantum dot nanoparticles but also reduce the voltage required for the electrodeposition. Specifically, when the porous material is used to be a carrier to load quantum dot nanoparticles to form a quantum dot composite material film, the self-absorption effect of the quantum dots can be effectively reduced due to the spacing effect and the scattering effect of the porous material. Therefore, the luminous efficiency of the quantum dot composite material film is higher than that of the film composed of only quantum dots. Furthermore, because nanomaterials such as quantum dot nanoparticles do not need to be modified to increase their charge, their good optoelectronic properties can be maintained.

The aforesaid description is just preferred embodiments of the present invention. For those of ordinary skill in the art, without departing from the principle of the present invention, several improvements and modifications can be made. These improvements and modifications should also be regarded as the protection scope of the present invention.

What is claimed is:

1. A composite material film, comprising:

at least one film layer comprising porous material units, wherein a surface of each porous material unit has pores loaded with nanoparticles or small organic molecules;

wherein a pore size of each pore is larger than a particle size of each nanoparticle or a size of each small organic molecule, and an outer surface of the porous material unit is grafted with a ligand comprising an ionic surfactant; and wherein a size of the porous material unit ranges from 50 nm to 1000 nm, the pore size ranges from 2 nm to 50 nm, and the particle size of the nanoparticle or the size of the small organic molecule ranges from 2 nm to 50 nm.

2. The composite material film of claim 1, wherein the porous material unit comprises at least one of mesoporous silica, a mesoporous carbon molecular sieve, or a mesoporous metal oxide.

3. The composite material film of claim 1, wherein the nanoparticles comprise quantum dot nanoparticles, and wherein the quantum dot nanoparticles comprise at least one of ZnCdSe$_2$, InP, Cd$_2$Se, CdSe, Cd$_2$SeTe, or InAs, and at least one of CdS, ZnSe, ZnCdSe$_2$, ZnS, or ZnO.

4. The composite material film of claim 1, wherein the ligands comprise at least one of amine-based ligands, thiol-based ligands, carboxylic acid-based ligands, or phosphorus ligands.

5. The composite material film of claim 1, wherein the ionic surfactant comprises at least one of sodium dodecyl benzene sulfonate, phosphate ester surfactant, or hexadecyl trimethyl ammonium bromide.

6. The composite material film of claim 1, wherein a mass ratio of the nanoparticle or the small organic molecule to the porous material unit ranges from 10:1 to 1:100.

7. A manufacturing method of a composite material film, comprising:

preparing a nanoparticle solution;

preparing a porous material unit solution;

adding a charged ligand to the porous material unit solution to charge a surface of a porous material unit in the porous material unit solution, wherein the charged ligand comprises an ionic surfactant, and an outer surface of the porous material unit is grafted with the ionic surfactant;

mixing the porous material unit solution with the nanoparticle solution to cause nanoparticles in the nanoparticle solution to enter pores of the porous material unit to form a composite material solution;

placing electrodes in the composite material solution; and applying electricity to the electrodes to cause the porous material unit loaded with the nanoparticles to deposit on one of the electrodes;

wherein a size of the porous material unit ranges from 50 nm to 1000 nm, the pore size ranges from 2 nm to 50 nm, and the particle size of the nanoparticle or the size of the small organic molecule ranges from 2 nm to 50 nm.

8. The manufacturing method of the composite material film of claim 7, wherein the porous material unit is selected from at least one of mesoporous silica, a mesoporous carbon molecular sieve, or a mesoporous metal oxide.

9. The manufacturing method of the composite material film of claim 8, wherein the porous material unit solution is prepared with a non-polar solvent.

10. A display panel, comprising:

a substrate;

a thin film transistor device layer disposed on the substrate;

an anode layer disposed on the thin film transistor device layer;

a light-emitting functional layer disposed on the anode layer;

a cathode layer disposed on the light-emitting functional layer; and an encapsulation layer disposed on the cathode layer;

wherein the light-emitting functional layer comprises a composite material film comprising:

at least one film layer comprising porous material units, wherein a surface of each porous material unit has pores loaded with quantum dot nanoparticles; and wherein a pore size of each pore is larger than a particle size of each quantum dot nanoparticle, and an outer surface of the porous material unit is grafted with a ligand comprising an ionic surfactant; and wherein a size of the porous material unit ranges from 50 nm to 1000 nm, the pore size ranges from 2 nm to 50 nm, and the particle size of the nanoparticle or the size of the small organic molecule ranges from 2 nm to 50 nm.

11. The display panel of claim 10, wherein the porous material unit comprises at least one of mesoporous silica, a mesoporous carbon molecular sieve, or a mesoporous metal oxide.

12. The display panel of claim 10, wherein the ligands comprise at least one of amine-based ligands, thiol-based ligands, carboxylic acid-based ligands, or phosphorus ligands.

* * * * *